Figure 1:
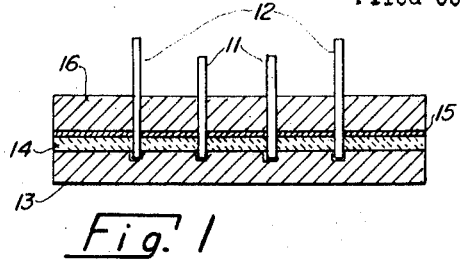

Jan. 28, 1969 S. FIALKOFF 3,424,657

PROCESS FOR MAKING METALLIC STRUCTURE

Filed Oct. 13, 1965

INVENTOR:
SAMUEL FIALKOFF
BY
Karl J. Ross
ATTORNEY.

United States Patent Office 3,424,657
Patented Jan. 28, 1969

3,424,657
PROCESS FOR MAKING METALLIC STRUCTURE
Samuel Fialkoff, Roslyn, N.Y., assignor to Camin Laboratories Inc., Brooklyn, N.Y., a corporation
Filed Oct. 13, 1965, Ser. No. 495,632
U.S. Cl. 204—9    12 Claims
Int. Cl. C23b 7/00

My present invention relates to a process for making metallic structures, such as injection nozzles for rocket motors, in which a wall of a reaction chamber is provided with a multiplicity of orifices opening onto an exposed surface of this wall within the chamber, certain of these orifices terminating at a manifold space within the structure while other orifices terminate beyond this manifold, usually at a second manifold space, so as to enable the separate introduction of different fluids (such as a liquid propellant and an oxidizer) into the chamber where they are intermingled and ignited.

In such nozzle structures it is necessary, for the proper distribution and dosing of the fluids, to array the several orifices in a precise pattern and to maintain their dimensions within close tolerances. In some instances it is also desirable to have the orifices, or some of them, inclined at a certain angle with reference to the perpendicular to the chamber wall.

The prior practice of forming such orifices by drilling has been very time-consuming as well as relatively costly, owing to the rapid wear of drill bits used on a highly refractory material.

It is, therefore, the general object of my present invention to provide a more rational process for manufacturing injection nozzles and other structures of this character.

A more particular object of my invention is to provide a process for this purpose which positively insures the proper dimensioning, positioning and orientation of all the orifices of the structure.

In my prior U.S. Patent No. 3,022,230, issued Feb. 20, 1962, I have disclosed and claimed a process for electroforming metallic bodies provided with internal channels. My present invention constitutes a further development of that patented process and involves, essentially, the positioning of a multiplicity of projecting pins on a matrix, or base, preferably having the form of a metallic master plate which can be reused indefinitely. These pins are divided into two groups which determine the size and location of a first and a second set of orifices, respectively, in the structure to be formed. The structure includes a first metallic layer, e.g. of nickel, which is electroformed on the base around all the pins to a thickness corresponding to that of the apertured wall of the desired structure; this thickness is less than the length of the pins so that the latter project from the metallic layer on both sides. Next, the first group of pins are trimmed to the level of an exposed surface of this metallic layer; thereafter, a destructible (preferably fusible) masking layer is deposited on the exposed surface of the metallic layer to a depth less than the projecting portions of the second group of pins, this masking layer being penetrated by the projecting pin portions. A second metallic layer is then electroformed on the masking layer around the tips of the projecting pin portions, whereupon the intervening masking layer is destroyed to leave a void representing the first manifold space referred to above.

The orifices themselves may be created in one of two ways. The first method simply involves the withdrawal of all the pins after the two metallic layers have been formed; in that case the masking layer should be provided with apertures centered on but wider than the projecting pin portions traversing this layer whereby, upon the electroforming of the second metallic layer, the deposited metal is first built up within these apertures to form tubular bosses around the projecting pins. The first set of orifices, left in the chamber wall upon the withdrawal of the first group of pins, then communicate with the first manifold space whereas the second group of orifices, similarly left upon the removal of the second set of pins, extend by way of the aforementioned bosses to the far side of the second metallic layer so as to remain isolated from that first manifold space. A second manifold space may be formed in analogous manner by the positioning of another destructible masking layer on the far side of the second metallic layer after the projecting second pins have been trimmed to the level of the latter layer. The entire unit may be surrounded by a shell which is attached to the two metallic layers and provided with inlets respectively communicating with the two manifold spaces; this shell is advantageously also produced by electroforming so as to be integral with the metallic layers previously produced.

The second manner of creating the orifices requires the use of metallic tubular pins, e.g. of stainless steel, whose center bores constitute the respective orifices; in that case the pins are not withdrawn and the electroformation of tubular bosses between the two metallic layers becomes unnecessary.

The masking layer or layers may consist of a low-melting alloy or organic material (e.g. a wax or a thermoplastic resin). In the latter case, of course, they must be provided (e.g. by spraying) with a suitable conductive coating in order to facilitate the electrodeposition of a metallic layer thereon.

The invention will be described in greater detail with reference to the accompanying drawing in which:

FIGS. 1–5 are cross-sectional views of a metallic structure made by a process according to the invention, shown in successive stages of formation; and FIGS. 6–10 are views similar to FIGS. 1–6, showing successive stages of formation in an alternate process according to the invention.

Reference will first be made to FIGS. 1–5 illustrating the process according to the invention in which use is made of removable solid pins. These pins are divided into two groups respectively designated 11 and 12; only two pins of each group have been shown for the sake of simplicity, yet it will be understood that in practice each group will be considerably more numerous. The pins 11 and 12 are initially held in bores of a base 13, FIG. 1, which may consist of metal such as aluminum or steel. A refractory layer 14 of ceramic or metallo-ceramic (cermet) material, is deposited upon the base 13 and around the pins 11, 12. Refractory layer 14 is painted with a conductive coating 15 preparatory to electrodeposition of a metallic layer 16, e.g. of nickel, which nonadherently surrounds the nonconductive pins 11, 12.

Figure 2:
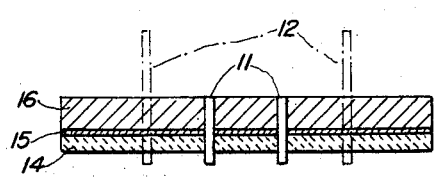

At a subsequent stage, illustrated in FIG. 2, the base 13 has been removed from the refractory layer 14 which had rested thereon with little or no adhesion; base 13 may then be studded with new pins for reuse. The pins 11 and 12 now project on both sides of the composite structure 14–16, yet at this point it becomes necessary to trim the projecting ends of the first set of pins 11 to the level of the exposed surface of metallic layer 16. This leveling operation is simplified, especially in the case of closely clustered pins, by a temporary removal of the other pins 12, as has been indicated by dot-dash lines in FIG. 2.

Following reinsertion of pins 12, a fusible masking layer 17 (FIG. 3) is placed on the metallic layer 16 in such manner that apertures 18 present in that layer, wider than the pins 12, are centered on the projecting ends of these pins so as to form annular clearances therearound. The masking layer 17 is preferably nonconductive and is painted on its exposed surface with a conductive coating 21 to facilitate the electrodeposition of a second masking layer 19, of the same material as layer 16, integral with tubular bosses 20 which occupy the annular clearances formed by the apertures 18 around the pins 12. It will be understood that, upon cathodic connection of layer 16 in a plating bath, the bosses 20 build up first and the layer 19 comes into existence only after the metal forming these bosses has reached the conductive coating 21 at the top.

Each metallic layer may be subjected, after its formation, to a machining and/or polishing operation in conformity with design specifications. When the assembly shown in FIG. 3 has been so treated, all the pins 11, 12 have been leveled off at their lower ends (as viewed in FIG. 4) to be flush with the refractory layer 14. The longer pins 12 have been similarly trimmed at their opposite ends to the level of metallic layer 19. A second masking layer 22 is now deposited on the layer 19 of high-melting metal; this masking layer may consist of a low-melting alloy, such as a eutectic composition of bismuth, lead, tin and cadmium having a melting point of 158° F. which is commercially available under the name "Cerrobend." The entire assembly is then encased, except for the exposed surface of refractory layer 14, in a shell 23 electroformed therearound; this shell may consist of the same metal (e.g. nickel) of which the layers 16 and 19 are formed.

Shell 23 is shown provided with a first inlet 24 and with a second inlet 25 respectively opening onto the spaces occupied by the masking layers 17 and 22. These inlets are in the form of metallic nipples and may be initially held in place by respective projections 17a and 22a on layers 17 and 22. The formation of the shell 23 locks the nipples 24 and 25 in position, whereupon the fusible layers 17 and 22 may be melted and discharged via the associated nipples to leave voids 26, 27 respectively communicating with inlets 24 and 25. The void 26 constitutes a first manifold space connected with the atmosphere by way of orifices 28 which are left in the layers 14, 15, 16 upon removal of the pins 11; the voil 27 constitutes a second manifold space opening into the atmosphere via orifices 29 left in these layers upon withdrawal of the pins 12, the latter orifices also penetrating the bosses 20 and the layer 19.

Figure 5:
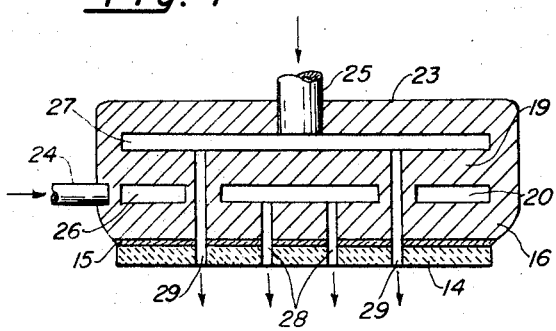

The finished structure, shown in FIG. 5, thus represents a nozzle head which discharges two fluids, respectively admitted via inlets 24 and 25, from orifices 28 and 29.

Figure 6:
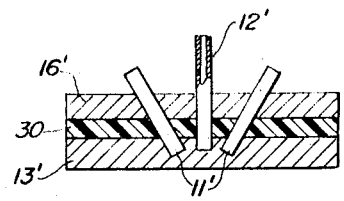

In carrying out the modified process illustrated in FIGS. 6–10, I start with a base 13' similar to base 13, this base being studded with tubular stainless-steel pins 11', 12' having bores of capillary size; the diameter of these bores corresponds to the desired orifice diameter, whereas in the previously described system the diameter of the orifice is determined by the outer diameter of the respective pin. As illustrated in FIG. 6, the pins 11' and 12' may be inclined at various angles with reference to one another and to a line perpendicular to the faces of base 13'.

Figure 7:
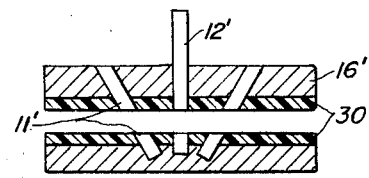
Figure 3:
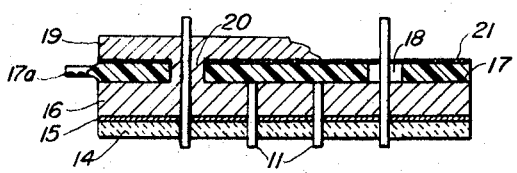
Figure 8:
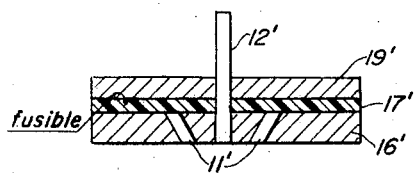
Figure 4:
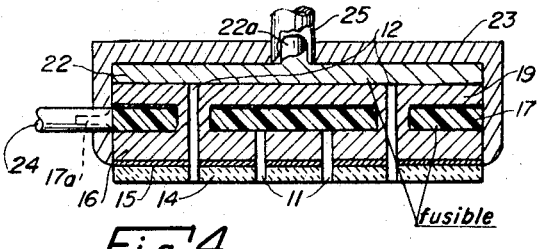

A fusible parting layer 30 is cast on the base 13' and is conductively coated to permit electrodeposition of a first metallic layer 16', e.g. of nickel. As shown in FIG. 7, the shorter pins 11' are cut down to the level of layer 16' whereas the longer pins 12' (only one illustrated) are allowed to project therebeyond. To separate the base 13' from layer 16', as likewise illustrated in FIG. 7, parting layer 30 may be severed longitudinally with concurrent clipping of the tubes 11' and 12'. The two severed portions of layer 30 are then melted off whereupon base 13' can be reused after removal of the pin stubs therefrom. The main body of each pin, remaining imbedded in layer 16', is leveled off at a lower face of that layer (as viewed in FIG. 8) whereupon a fusible masking layer 17' is cast or otherwise deposited onto the opposite surface of layer 16' so as to surround the projecting parts of pins 12'. Another metallic layer 19' is then electroformed on masking layer 17' so as to become integral with pin 12" which is thereafter cut down to the level of the latter layer, see FIG. 9. After the masking layer 17' has been melted out, a manifold space 26' is formed which communicates with the opposite surface of bottom layer 16' by way of the bores of what is left of the tubular pins 11' imbedded in that layer. The bores of pins 12' constitute orifices which connect the space above layer 19' with the space below layer 16'.

Figure 9:
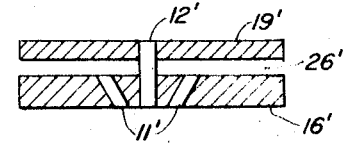
Figure 10:
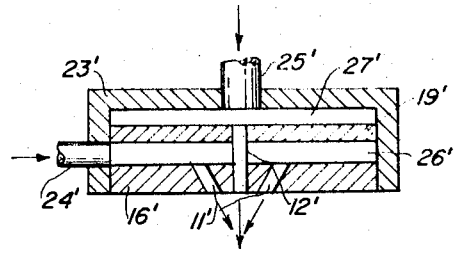

As shown in FIG. 10, a shell 23' with inlets 24' and 25' may be placed around the assembly of FIG. 9, thereby defining a further manifold space 27' communicating with the bores of all the pins 12'. Shell 23' may have been separately produced or may have been electroformed around the composite layer structure substantially as described with reference to FIGS. 4 and 5.

Naturally, solid pins as shown in FIGS. 1–5 and tubular pins as shown in FIGS. 6–10 could be used in combination with each other if desired. Other modifications of the process described and illustrated will readily occur to persons skilled in the art and are also intended to be embraced within the spirit and scope of my invention as defined in the appended claims.

I claim:

1. A process for making a metallic structure with a wall having a multiplicity of orifices opening onto an exposed surface of said wall, said orifices including a first group of orifices terminating at a manifold within said structure and a second group of orifices terminating beyond said manifold, comprising the steps of:

providing a base with a multiplicity of first and second pins projecting therefrom;

electroforming a first metallic layer on said base around all said pins with the latter projecting on both sides of said layer;

trimming said first pins to the level of an exposed surface of said first metallic layer;

depositing a destructible masking layer on said exposed surface to a depth less than the length of the projecting portions of said second pins, said masking layer having apertures centered on but wider than said second pins;

electroforming a second metallic layer on said masking layer around the tips of said projecting portions of said second pins, said layer being formed integral with tubular bosses extending through said apertures around said second pin into firm contact with said first metallic layer;

removing said base and said pins; and destroying said masking layer, thereby leaving a manifold space communicating with orifices left in said first metallic layer upon withdrawal of said first pins.

2. A process as defined in claim 1 wherein said masking layer is fusible and is destroyed by melting.

3. A process as defined in claim 1 wherein said base is removed prior to withdrawal of any of said pins.

4. A process as defined in claim 1 wherein said second pins are temporarily removed prior to the trimming of said first pins and are subsequently reinserted upon completion of such trimming.

5. A process as defined in claim 1 wherein said first and second metallic layers are interconnected by an outer shell attached thereto prior to destruction of said masking layer, said shell being provided with at least one conduit for the passage of fluid to said manifold space.

6. A process as defined in claim 5 wherein said masking layer is fusible and is destroyed by melting, with the molten material removed from the manifold space by way of said conduit.

7. A process as defined in claim 5 wherein said shell is produced by electroforming around said metallic and masking layers.

8. A process as defined in claim 7 wherein said masking layer is formed with a boss serving as a temporary attachment for said conduit prior to electroformation of said shell.

9. A process as defined in claim 7 wherein said second pins are trimmed to the level of said second metallic layer whereupon a second destructible masking layer is deposited upon said second metallic layer prior to the formation of said shell, said second masking layer being destroyed in situ after formation of said shell, thereby leaving a second manifold space communicating with orifices left in said first and second metallic layers upon withdrawal of said second pins, at least one further conduit being anchored to the structure by the formation of said shell in communication with said second manifold space.

10. A process as defined in claim 9 wherein said second masking layer is fusible and is destroyed by melting, the molten material being removed from said second manifold space by way of said further conduit.

11. A process as defined in claim 1 wherein a refractory layer is deposited on said base prior to formation of said first metallic layer and is retained on the latter upon removal of said base.

12. A process for making a metallic structure with a wall having a multiplicity of orifices opening onto an exposed surface of said wall, said orifices including a first group of orifices terminating at a manifold within said structure and a second group of orifices terminating beyond said manifold, comprising the steps of:
providing a base with a multiplicity of first and second tubular pins projecting therefrom;
electroforming a first metallic layer on said base around all said pins with the latter projecting on both sides of said layer;
trimming said first pins to the level of an exposed surface of said first metallic layer;
depositing a destructible masking layer on said exposed surface to a depth less than the length of the projecting portions of said second pins, said masking layer being penetrated by said second pins;
electroforming a second metallic layer on said masking layer around the tips of said projecting portions of said second pins;
trimming said second pins to the level of a face of said second metallic layer remote from said first metallic layer;
removing said base and leveling the projecting ends of said pins exposed upon such removal; and
destroying said masking layer, thereby leaving a manifold space communicating with orifices constituted by the bores of said first pins.

References Cited

UNITED STATES PATENTS

| 1,575,915 | 3/1926 | Hart | 204—11 |
| 3,022,230 | 2/1962 | Fialkoff | 204—9 |
| 3,317,407 | 5/1967 | Kratzmeyer et al. | 204—9 |

FOREIGN PATENTS

| 71,861 | 4/1893 | Germany. |

JOHN H. MACK, *Primary Examiner.*

T. TUFARIELLO, *Assistant Examiner.*

U.S. Cl. X.R.

204—11, 16